(No Model.)

W. J. DEVERS.
CRANK MOTION.

No. 538,242.  Patented Apr. 30, 1895.

Witnesses
Chas. A. Ford.

Inventor
William J. Devers,
By his Attorneys.
C. A. Snow & Co.

UNITED STATES PATENT OFFICE.

WILLIAM J. DEVERS, OF SCRANTON, PENNSYLVANIA, ASSIGNOR OF ONE-THIRD TO THOMAS SHOTTON, OF SAME PLACE.

CRANK-MOTION.

SPECIFICATION forming part of Letters Patent No. 538,242, dated April 30, 1895.

Application filed March 22, 1894. Serial No. 504,680. (No model.)

*To all whom it may concern:*

Be it known that I, WILLIAM J. DEVERS, a citizen of the United States, residing at Scranton, in the county of Lackawanna and State of Pennsylvania, have invented a new and useful Crank-Motion, of which the following is a specification.

My invention relates to an improvement in crank motions, adapted especially for use in connection with bicycles and similar vehicles; the objects in view being to simplify the construction and reduce the cost of manufacture of eccentrically operated crank pins, and particularly to reduce the number of parts necessary to accomplish the irregular or eccentric movements of the crank-pin.

Further objects and advantages of the invention will appear in the following description, and the novel features thereof will be particularly pointed out in the appended claims.

Figure 1:
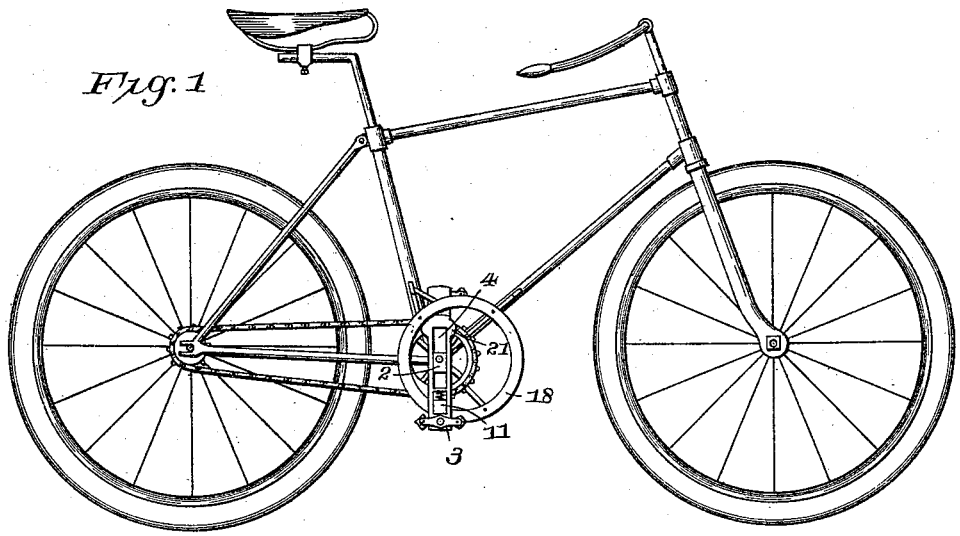
Figures 2, 3, 4:
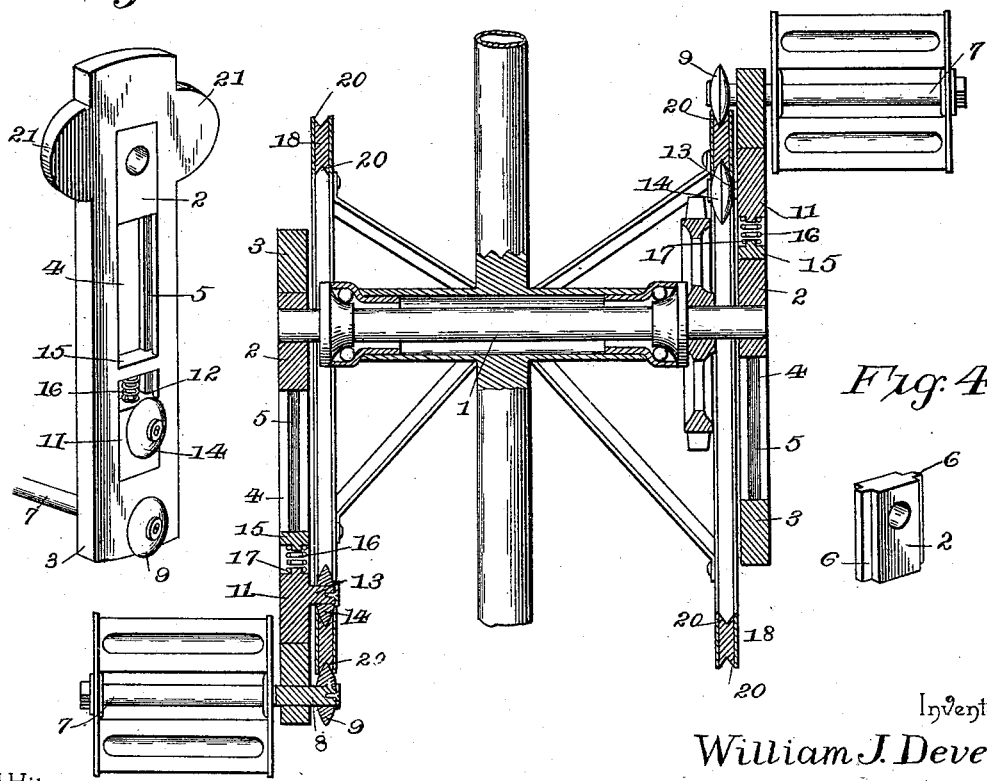

In the drawings, Figure 1 is a side view of a crank motion embodying my invention applied in the operative relation to a bicycle. Fig. 2 is a sectional view of the crank-motion taken parallel with the axis of the driven shaft. Fig. 3 is a detail view in perspective of the crank-arm. Fig. 4 is a similar view of the head or guide which is fixed to the driven shaft and forms a part of the crank-arm, said part being detached.

Similar numerals of reference indicate like parts in all the figures of the drawings.

1 designates the driven-shaft, to an extremity of which is fixed an elongated head or guide 2 forming one member of a crank arm, and 3 represents the slidable member of the crank-arm, which is slotted longitudinally to receive said head or guide, and is provided at the sides of its slot 4 with registering grooves 5, in which fit webs 6 on the lateral edges of the head or guide, thus forming interlocking sliding connection between the members of the crank-arm.

7 represents a crank-pin which is fixed to the outer or free end of the crank-arm, and is preferably extended upon both sides of the plane of the crank-arm, whereby its inner end 8 forms a spindle upon which is mounted an outer anti-friction roll 9. Mounted slidably in the outer end of the slot in the crank-arm is a follower-block 11 also provided at its edges with webs 12, fitting in the grooves formed in the crank-arm at the sides of its slot to form an interlocking connection, and this follower-block carries a spindle 13, upon which is mounted an inner anti-friction roll, 14.

15 represents a cross-bar, which spans the slot in the crank-arm, at an intermediate point, and arranged between the outer side of this cross-bar, and the opposite inner end of the follower-block is an actuating coiled spring 16 to press the follower-block outward, whereby the inner anti-friction roll carried thereby is pressed toward the outer anti-friction roll. The ends of said actuating spring engages studs 17, which are formed respectively upon the outer surface of the cross-bar and the inner end of the follower-block to prevent displacement.

18 represents a fixed annular track or rim, which is arranged eccentrically with relation to the driven shaft, and is provided in its inner and outer edges with grooves 20 for the reception of the peripheries of the anti-friction rolls above described, thereby providing an interlocking connection between the outer end of the crank-arm and the track or guide.

As the crank-arm is rotated around the driven shaft as an axis, said crank-arm, by reason of the eccentricity of the track or rim, receives a reciprocal movement. The object of this arrangement is to lengthen the effective portion of the crank-arm, or that portion thereof which is between the axis of the driven shaft and the crank-pin, at one part of the movement of the crank-arm, and shorten the effective portion thereof at another part of its movement, for a purpose which will be readily understood.

In order to counterbalance the outer or free end of the crank-arm when the effective portion of such crank-arm is shortened, I provide the inner end of the crank-arm with an enlargement or weight 21. When the effective portion of the crank-arm is lengthened, the enlargement or weight is arranged concentric with the axis of the driven shaft.

In the drawings I have shown my improved crank-motion applied to a bicycle, and in this case, as will be obvious, the mechanism above described is duplicated upon the opposite side of the machine.

In order to prevent lateral vibration of the free end of the crank-arm, especially when the latter is extended, I preferably construct the track or rim with V-shaped grooves in its inner and outer edges, and provide the anti-friction rolls with V-shaped peripheries to fit snugly therein, as above described, and in order to prevent rattling and undue friction between the anti-friction rolls and the sides of the grooves in the track or rim, I preferably construct the track or rim with a central annular core of hard wood or similar material, in the edges of which are formed the grooves above described, and annular side or facing plates secured to the opposite sides of said core with their edges flush with the edges of the core. By this construction the V-shaped peripheries of the anti-friction rolls contact solely with the core of the track or rim and do not come in contact with the side or facing plates, which are preferably of metal.

It will be seen that the inner or adjustable anti-friction roll is held firmly in contact with the inner edge of the track or rim, and is capable of taking up any lost motion which may occur by reason of wear on the contacting parts, and, in addition to this advantage, the resilience of this inner roll prevents injury to the parts when, the device being used in connection with a bicycle, the downward pressure upon the crank-pin is continued after the crank-arm reaches a substantially vertical or pendent position. It will be seen, furthermore, that by the above construction I provide an eccentrically operated crank-pin, in which the crank-arm is constructed of a single movable part or member, which extends from the driven shaft to the pin, and a head or guide by which the connection with the driven-shaft is formed, the same being fixed to the driven shaft, and therefore adding but slightly to the weight of the free or outer end of the crank-arm. Furthermore, I provide an interlocking connection between the parts or members of the crank-arm, and an interlocking connection between the movable member of the arm and the track or guide, to prevent lateral deflection and vibration of the free end of the arm while permitting free movement in a plane parallel with the track or guide. It will be seen that the head or guide and the follower-block are of equal thickness with the slotted arm, and are flush at their surfaces with the corresponding surfaces of the arm, thus presenting smooth surfaces to prevent injury to the clothing of the rider.

Various changes in the form, proportion and the minor details of construction may be resorted to without departing from the spirit of the invention or sacrificing any of the advantages thereof.

Having described my invention, what I claim is—

1. The combination with a driven-shaft, of a crank-arm having one member fixed to the shaft, and a slidable member provided with a slot in which the fixed member fits, the contacting surfaces of said members being provided with intermeshing ribs and grooves, a track or guide eccentric with the driven-shaft, and anti-friction rolls carried by the slidable member of the crank-arm and respectively engaging the inner and outer peripheries of the track or guide, said rollers and the track or guide being provided with interlocking peripheries, substantially as specified.

2. The combination with a driven-shaft, of a crank-arm having one member fixed to the shaft, and a movable member slidably mounted upon the first-named member, a track or guide eccentric with the driven-shaft and provided with sectionally V-shaped inner and outer grooves, and inner and outer anti-friction guide-rollers, mounted upon the movable member of the crank-arm and operating, respectively, in the said grooves of the track or guide, said rollers having reduced or V-shaped peripheries to form an interlocking connection with the track or guide, substantially as specified.

3. The combination with a driven-shaft, of a crank-arm having a movable member slidably mounted upon said shaft, an annular track or rim arranged eccentrically with relation to the driven-shaft, and anti-friction rolls carried by the crank-arm and engaging the inner and outer edges of the track or rim, one of said rolls being spring-actuated to hold it in contact with the track or rim, substantially as specified.

4. The combination with a driven-shaft, and a crank-arm having a head or guide fixed to the shaft, and a movable member slidably mounted upon the head or guide, of an eccentrically disposed track or rim comprising an annular core of wood provided in its inner and outer edges with V-shaped grooves, annular side or facing plates secured to the opposite sides of said core with their edges flush with the edges of the same, and anti-friction rolls carried by the crank-arm and provided with V-shaped peripheries to engage the V-shaped grooves of the track or rim, whereby said rolls are held out of contact with the side or facing plates of such track or rim, substantially as specified.

5. The combination with a driven-shaft, of a crank-arm having one member fixed to said shaft, an interlocking sliding connection between the members of the crank-arm, a guide or track arranged eccentrically with the driven-shaft, and anti-friction rolls mounted on the slidable-member of the crank-arm and engaging the track or guide, said rolls having an interlocking bearing on the track or guide to prevent lateral deflection either toward or from the track or guide, substantially as specified.

In testimony that I claim the foregoing as my own I have hereto affixed my signature in the presence of two witnesses.

WILLIAM J. DEVERS.

Witnesses:
J. RUSSELL PECK,
M. J. CLARK.